(12) United States Patent
Hwang et al.

(10) Patent No.: US 11,353,142 B2
(45) Date of Patent: Jun. 7, 2022

(54) CABLE BINDING DEVICE

(71) Applicants: HYUNDAI MOTOR COMPANY, Seoul (KR); KIA MOTORS CORPORATION, Seoul (KR); YURA CORPORATION CO., LTD., Seongnam-si (KR)

(72) Inventors: Sanghyeon Hwang, Gunpo-si (KR); Woncheol Kim, Bucheon-si (KR); Jongmin Sung, Gunpo-si (KR); Cheonhee Kang, Suwon-si (KR)

(73) Assignees: HYUNDAI MOTOR COMPANY, Seoul (KR); KIA MOTORS CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 116 days.

(21) Appl. No.: 17/031,217

(22) Filed: Sep. 24, 2020

(65) Prior Publication Data
US 2021/0148488 A1   May 20, 2021

(30) Foreign Application Priority Data
Nov. 20, 2019 (KR) .................. 10-2019-0149218

(51) Int. Cl.
*H02G 3/30* (2006.01)
*F16L 3/233* (2006.01)
*H02G 3/32* (2006.01)

(52) U.S. Cl.
CPC .......... *F16L 3/2334* (2013.01); *F16L 3/2336* (2013.01); *H02G 3/32* (2013.01)

(58) Field of Classification Search
CPC .......... Y10T 24/44026; Y10T 24/1498; Y10T 24/14; F16L 3/04; H02G 3/30; H02G 3/32; B60R 16/0215
USPC ........................................... 248/71
See application file for complete search history.

(56) References Cited

U.S. PATENT DOCUMENTS

| | | | | |
|---|---|---|---|---|
| 5,669,110 A | * | 9/1997 | Parsons ................... | E05B 75/00 24/16 PB |
| 5,868,362 A | * | 2/1999 | Daoud ..................... | H02G 3/26 248/68.1 |
| 6,219,887 B1 | * | 4/2001 | Parsons ................... | E05B 75/00 24/484 |
| 8,453,794 B2 | * | 6/2013 | Melic ...................... | E04G 21/3276 52/703 |
| 2013/0153716 A1 | * | 6/2013 | Lothamer ............... | B60R 16/0215 248/68.1 |
| 2019/0277429 A1 | * | 9/2019 | Shinba .................... | F16L 3/233 |

(Continued)

*Primary Examiner* — Robert Sandy
*Assistant Examiner* — Michael S Lee
(74) *Attorney, Agent, or Firm* — Lempia Summerfield Katz LLC

(57) ABSTRACT

A cable binding device includes a first binding member including a first binding part binding a circumference of a first cable and a first fastening part connected to the first binding part. The first fastening part is fastened to a fixing hole formed on a panel. The first fastening part is also protruding to the opposite side of the panel. The cable binding device also includes a second binding member including a second binding part binding a second cable on the opposite side of the panel and a second fastening part connected to the second binding part. The second fastening part is fastened to the first fastening part protruding to the opposite side of the panel.

7 Claims, 5 Drawing Sheets

(56) References Cited

U.S. PATENT DOCUMENTS

2020/0185899 A1\* 6/2020 Leng .................. F16L 3/221
2020/0406840 A1\* 12/2020 Egami ............... B60R 16/0215

\* cited by examiner

CABLE BINDING DEVICE

CROSS-REFERENCE TO RELATED APPLICATION(S)

This application is based on and claims priority under 35 U.S.C. § 119 to Korean Patent Application No. 10-2019-0149218, filed on Nov. 20, 2019, in the Korean Intellectual Property Office, the disclosure of which is incorporated by reference herein in its entirety.

BACKGROUND

1. Field

The disclosure relates to a cable binding device capable of binding cables on opposite sides of a panel, respectively, with sharing fixing holes formed on the panel.

2. Description of the Related Art

A plurality of cables, commonly called wiring harnesses, for signal transmission, grounding, and power supply is installed in a vehicle and the like. The cables are fixed to a panel of a vehicle body and the like in a state of being bound by a cable binding device.

A fixing hole for fixing the cable binding device is formed at positions spaced apart in a wiring direction on the panel of the vehicle body. The cable binding device is fixed to the fixing hole of the vehicle body in a state of binding the cable.

A typical cable binding device includes a band-shaped binding part binding a circumference of a cable and a fastening part connected to the binding part. The fastening part is fastened in a hooked manner after being inserted into a fixing hole of a vehicle body. The fastening part includes a locking portion penetrating through the fixing hole to protrude to the opposite side of the panel and elastically deformed to be caught on the opposite side of the panel.

Because one fixing hole is required for each cable binding device when cables are installed using the cable binding device as above, a plurality of fixing holes is required to be provided along a wiring path on the panel of the vehicle body. Also, because a cable binding device is required to be separately installed for each cable when different cables are installed side by side at mutually adjacent locations, separate fixing holes are required to be provided on the panel of the vehicle body.

However, in the above cable installation method, a wiring path may not be optimally set because the fixing holes are required to be formed at mutually spaced locations. Manufacturing cost of the vehicle body may increase because a plurality of fixing holes is required to be processed on the vehicle body. A plurality of fixing holes formed on the panel of the vehicle body may also reduce the strength of the vehicle body.

SUMMARY

It is an aspect of the disclosure to provide a cable binding device capable of binding cables on opposite sides of a panel, respectively, with sharing fixing holes formed on the panel.

Additional aspects of the disclosure are set forth in part in the description which follows and, in part, should be understood from the description or may be learned by practice of the disclosure.

In accordance with an aspect of the disclosure, a cable binding device includes a first binding member including a first binding part binding a circumference of a first cable and a first fastening part connected to the first binding part. The first fastening part is fastened to a fixing hole formed on a panel. The first fastening part is also protruding to the opposite side of the panel. The cable binding device also includes a second binding member including a second binding part binding a second cable on the opposite side of the panel and a second fastening part connected to the second binding part. The second fastening part is fastened to the first fastening part protruding to the opposite side of the panel.

The first fastening part may include one or more first locking portions elastically deformed to be caught on the opposite side of the panel after passing through the fixing hole. The first fastening part may also include one or more second locking portions on and to which the second fastening part is caught and fastened.

The second fastening part may include a fastening housing accommodating the first fastening part protruding to the opposite side of the panel. The second fastening part may also include one or more third locking portions provided in the fastening housing and elastically deformed to be caught on the second locking portion.

The fastening housing may include one or more openings to allow a tool to enter inside the fastening housing from outside the fastening housing to release the locking of the third locking portion.

In accordance with another aspect of the disclosure, a cable binding device, which is coupled with another cable binding device having a protrusion-shaped fastening part binding a cable on one side of a panel and fastened to a fixing hole of the panel, includes a fastening housing fastened to the protrusion-shaped fastening part on the other side of the panel. The cable binding device also includes a binding part binding another cable in a state of being connected to the fastening housing.

The fastening housing may be fastened to the protrusion-shaped fastening part in a state of accommodating the protrusion-shaped fastening part.

The cable binding device may further include one or more locking portions provided in the fastening housing and caught on the protrusion-shaped fastening part by being elastically deformed.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Hereinafter embodiments of the disclosure are described in detail with reference to the accompanying drawings. The embodiments described below are provided by way of example so that those having ordinary skill in the art are able to fully understand the spirit of the disclosure. The disclosure is not limited to the embodiments described below and may be embodied in other forms. In order to clearly explain the disclosure, parts not related to the description have been omitted from the drawings, and the width, length, thickness, and the like of the components may be exaggerated for convenience.

Figure 1:
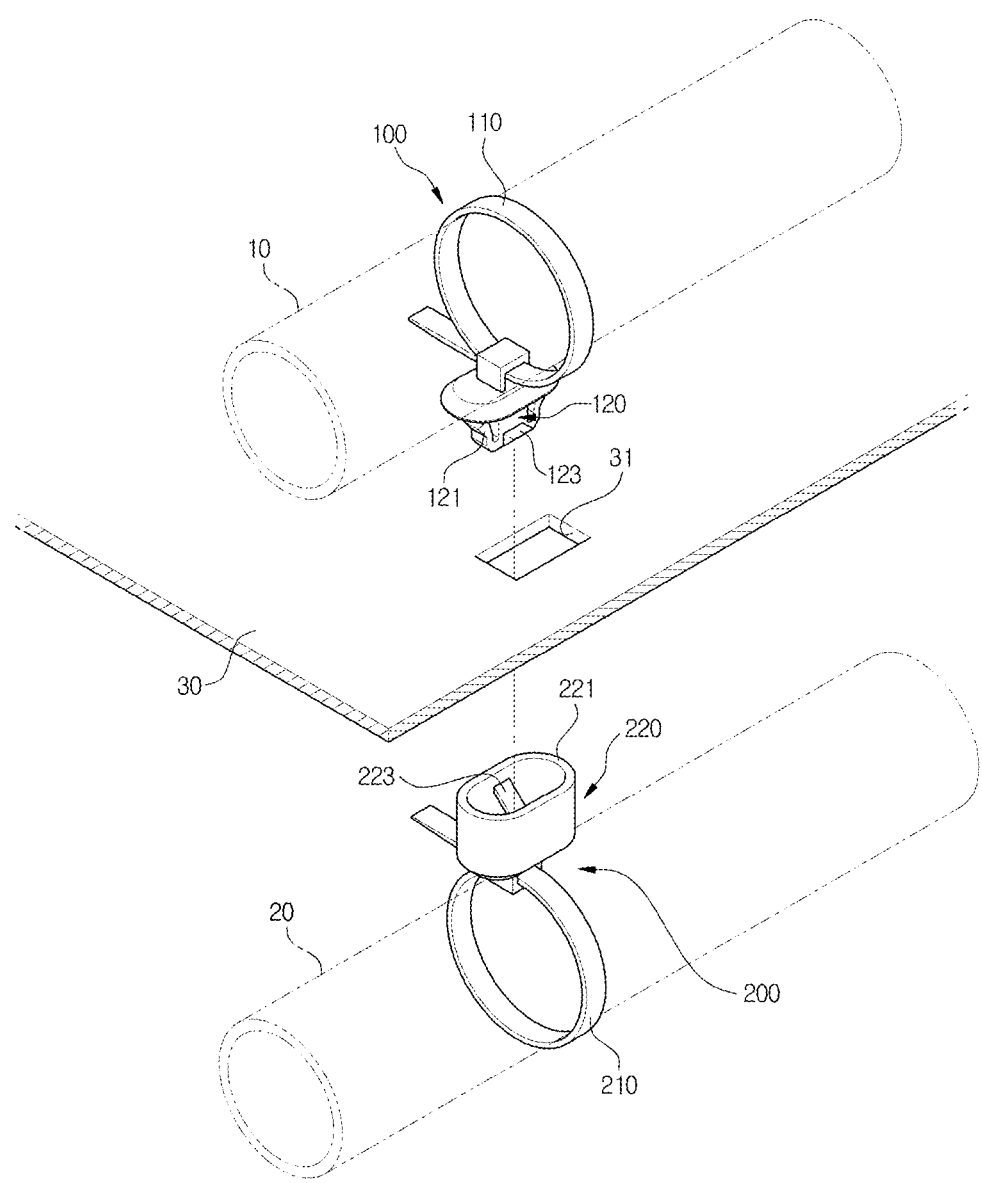
FIG. 1 is a perspective view of a cable binding device according to an embodiment of the disclosure.
Figure 2:
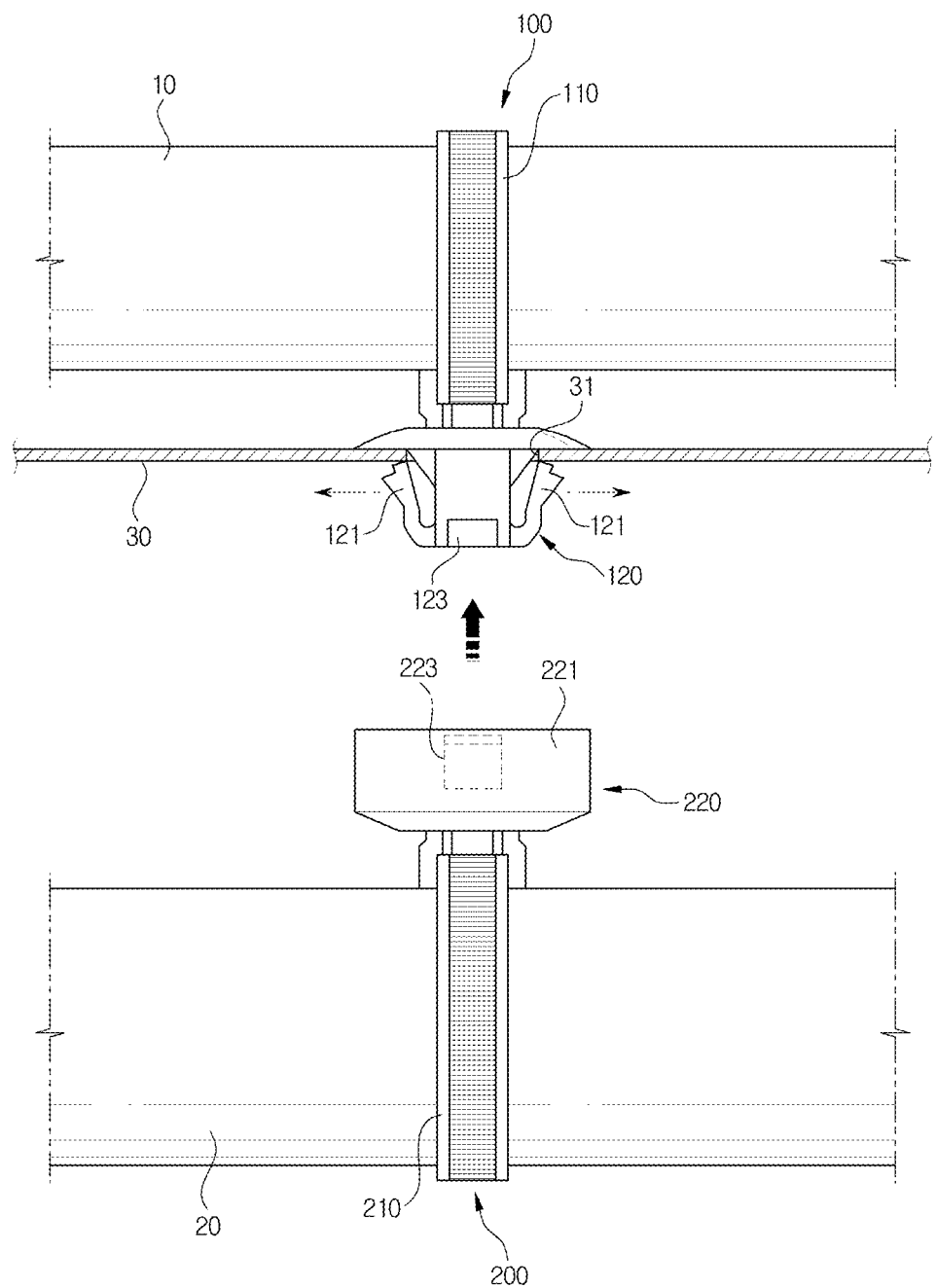
FIG. 2 is a front view of the cable binding device according to an embodiment of the disclosure, showing a state in which a second fastening member is separated.

Referring to FIGS. 1 and 2, a cable binding device according to an embodiment of the disclosure includes a first binding member 100 and a second binding member 200.

The first binding member 100 may be fastened to a fixing hole 31 formed on a panel 30 and the like of a vehicle body in a state of binding a circumference of a first cable 10. The second binding member 200 may be fastened to the first binding member 100 in a state of binding a second cable 20 on the opposite side of the panel 30.

The first binding member 100 includes a first binding part 110 binding the circumference of the first cable 10 and a first fastening part 120 fastened to the fixing hole 31 formed on the panel 30 in a state of being connected to the first binding part 110.

The first binding part 110 may be formed integrally with the first fastening part 120 by a resin material and may be formed in a band shape in which the circumference of the first cable 10 is tightened and bound. Although the first binding part 110 may be formed in a band shape as an example, the first binding part 110 is not limited thereto, and may be a ring-shaped clamp that binds the circumference of the first cable 10.

Figure 4:
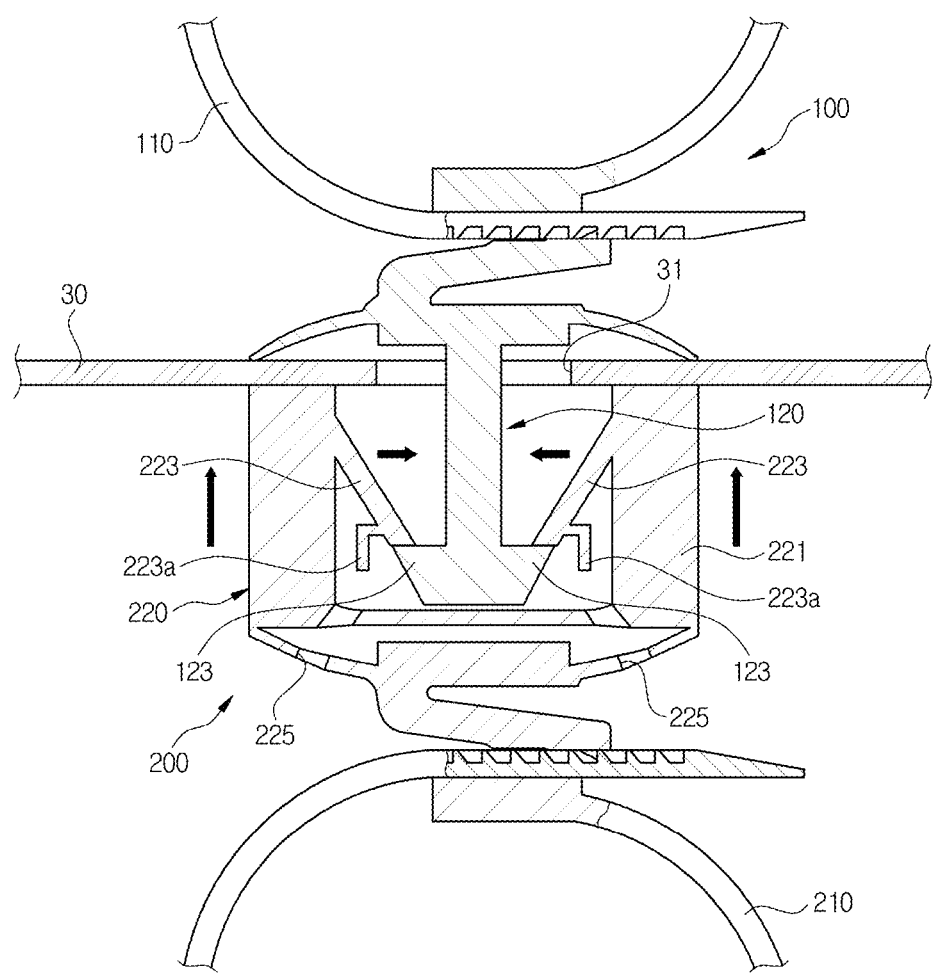
FIG. 4 is a cross-sectional view taken along line A-A' in FIG. 3.

The first fastening part 120 includes first locking portions 121 passing through the fixing hole 31 of the panel 30 to protrude to the opposite side of the panel 30 and elastically deformed to be caught on the opposite side of the panel 30, as shown in FIGS. 2 and 4. The first locking portions 121 are provided on opposite sides of the first fastening part 120, respectively. After the first fastening part 120 passes through and is fastened to the fixing hole 31, the first locking portions 121 spread to both sides to be caught on the opposite side of the panel 30, so that the first fastening part 120 is bound to the fixing hole 31 of the panel 30.

The first fastening part 120 includes one or more second locking portions 123 protruding from sides thereof so that the second binding member 200 coupled on the opposite side of the panel 30 may be caught and fastened to the first binding member 100. The second locking portions 123 may be provided on opposite sides of the first fastening part 120, the opposite sides being sides where the first locking portions 121 are not located, respectively.

Figure 3:
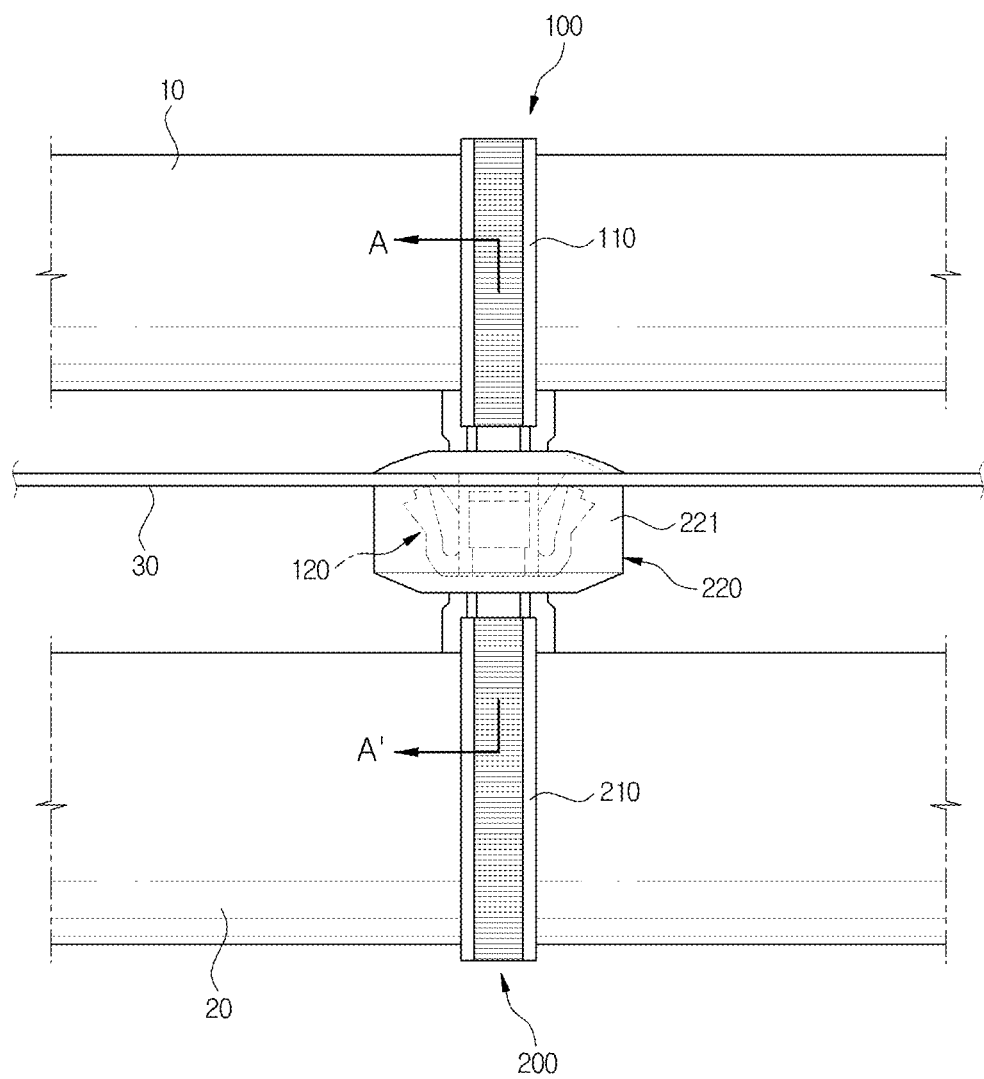
FIG. 3 is a front view of the cable binding device according to an embodiment of the disclosure, showing a state in which the second fastening member is fastened.

The second binding member 200, as shown in FIGS. 2-4, includes a second binding part 210 binding a circumference of the second cable 20 installed on the opposite side of the panel 30. The second binding member 200 also includes a second fastening part 220 connected to the second binding part 210. The second fastening part 220 is fastened to the first fastening part 120 protruding to the opposite side of the panel 30.

Like the first binding part 110, the second binding part 210 may be integrally formed with the second fastening part 220 and may be formed in a band shape in which the circumference of the second cable 20 is bound. The second binding part 210 may also be a ring-shaped clamp that binds the circumference of the second cable 20.

The second fastening part 220, as shown in FIGS. 1, 2, and 4, includes a fastening housing 221 accommodating the first fastening part 120 of the first binding member 100. The second fastening part 220 also includes one or more third locking portions 223 provided inside the fastening housing 221 and elastically deformed to be caught on the second locking portions 123 of an outer surface of the first fastening part 120.

The third locking portions 223, as shown in FIG. 4, may extend slantingly toward the inner center of the fastening housing 221 from opposite inner surfaces adjacent to an opening of the fastening housing 221, respectively. Therefore, when the fastening housing 221 is coupled to the first fastening part 120 in a form in which the first fastening part 120 formed in a protrusion shape is accommodated, both of the third locking portions 223 may be elastically deformed to be caught on and fastened to the second locking portions 123 of the first fastening part 120.

Because the cable binding device of the present embodiment has a structure in which the second binding member 200 binding the other cable on the opposite side of the panel 30 is fastened to the protrusion-shaped first fastening part 120 of the first binding member 100, the different cables 10 and 20 may be bound to the opposite sides of the panel 30, respectively, with sharing the fixing hole 31 of the panel 30. Therefore, when the cable binding device of the present embodiment is used, the number of the fixing holes 31 for installation of cables may be reduced. Space occupancy for installation of cables may also be reduced.

Figure 5:
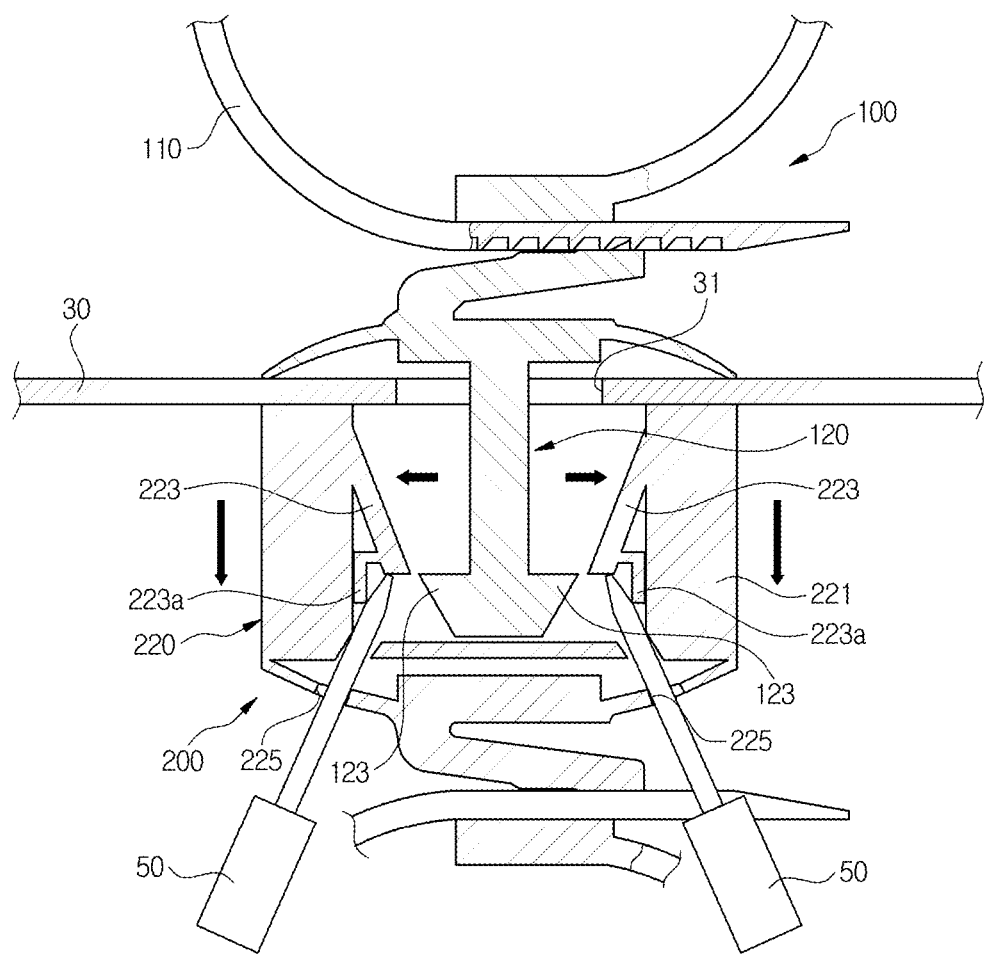
FIG. 5 is a cross-sectional view taken along line A-A' in FIG. 3, showing an example in which the second fastening member is separated using a tool.

Referring to FIG. 5, the fastening housing 221 of the second binding member 200 includes one or more openings 225 allowing a tool 50 to enter from the outside to release the locking of the third locking portion 223.

When the second binding member 200 is to be separated, the tool 50, such as a screwdriver, enters into the fastening housing 221 through the opening 225 to release the locking of the third locking portion 223, so that the second binding member 200 may be easily separated. The third locking portion 223 may include a tool catching protrusion 223a on which the tool 50 is caught to enable release of the locking portion using the tool 50.

The cable binding device of the present embodiment, as shown in FIG. 4, may be used not only when the first cable 10 and second cable 20, which are different from each other, are installed on the opposite sides of the panel 30, but also may be used for the purpose of binding only the first cable 10 by using the first binding member 100 just like a conventional cable binding device.

As is apparent from the above, a cable binding device according to an embodiment of the disclosure has a structure in which a second binding member binding another cable on the opposite side of a panel is fastened to a protrusion-shaped first fastening part of a first binding member. Different cables can be bound to the opposite sides of the panel, respectively, with sharing a fixing hole of the panel.

When the cable binding device according to an embodiment of the disclosure is used, the number of fixing holes for installation of cables can be reduced. Space occupancy for installation of cables can also be reduced.

What is claimed is:
1. A cable binding device comprising:
 a first binding member comprising:
  a first binding part binding a circumference of a first cable; and
  a first fastening part connected to the first binding part, the first fastening part being fastened to a fixing hole formed on a panel and protruding to the opposite side of the panel; and
 a second binding member comprising:

a second binding part binding a second cable on the opposite side of the panel: and a second fastening part connected to the second binding part, the second fastening part being fastened to the first fastening part protruding to the opposite side of the panel.

2. The cable binding device of claim 1, wherein the first fastening part comprises:

one or more first locking portions elastically deformed to be caught on the opposite side of the panel after passing through the fixing hole; and one or more second locking portions, wherein the second fastening part is caught on and fastened to the one or more second locking portions.

3. The cable binding device of claim 2, wherein the second fastening part comprises:

a fastening housing accommodating the first fastening part protruding to the opposite side of the panel; and one or more third locking portions provided in the fastening housing and elastically deformed to be caught on the second locking portion.

4. The cable binding device of claim 3, wherein the fastening housing comprises one or more openings to allow a tool to enter inside the fastening housing from outside the fastening housing to release the locking of the third locking portion.

5. A cable binding device, which is coupled with another cable binding device having a protrusion-shaped fastening part binding a cable on one side of a panel and fastened to a fixing hole of the panel, the cable binding device comprising:

a fastening housing fastened to the protrusion-shaped fastening part on another side of the panel; and a binding part binding another cable in a state of being connected to the fastening housing.

6. The cable binding device of claim 5, wherein the fastening housing is fastened to the protrusion-shaped fastening part in a state of accommodating the protrusion-shaped fastening part.

7. The cable binding device of claim 5, further comprising:

one or more locking portions provided in the fastening housing and caught on the protrusion-shaped fastening part by being elastically deformed.

\* \* \* \* \*